United States Patent [19]

Moy et al.

[11] 3,833,462

[45] Sept. 3, 1974

[54] PROCESS OF REMOVING SODIUM CHLORIDE FROM KRAFT PULPING PROCESS CHEMICAL RECOVERY SYSTEMS

[75] Inventors: Walick A. Moy, Nanaimo; Garrick E. Styan, North Burnaby, British Columbia, both of Canada

[73] Assignee: MacMillan Bloedel Limited, Vancouver, British Columbia, Canada

[22] Filed: Mar. 15, 1971

[21] Appl. No.: 124,003

[52] U.S. Cl.................. 162/29, 162/30, 423/499
[51] Int. Cl............................................. D21c 11/06
[58] Field of Search.............. 162/30, 31, 29; 23/48, 23/121; 423/207, 215, 551, 499

[56] References Cited
UNITED STATES PATENTS

| | | | |
|---|---|---|---|
| 1,375,759 | 4/1921 | Olsson | 162/30 |
| 2,645,561 | 7/1953 | Malm | 23/121 |
| 2,749,212 | 6/1956 | Crowder | 23/48 |
| 3,017,245 | 1/1962 | Goodenough | 23/121 X |
| 3,331,732 | 7/1967 | Venemark | 162/30 |
| 3,349,921 | 10/1967 | Nina et al. | 23/48 X |
| 3,366,534 | 1/1968 | Rapson | 162/30 |
| 3,694,307 | 9/1972 | Inahashi | 162/30 |
| 3,698,995 | 10/1972 | Rapson | 162/19 |
| 3,746,612 | 7/1973 | Rapson et al. | 162/17 |

FOREIGN PATENTS OR APPLICATIONS

| | | |
|---|---|---|
| 707,813 | /1954 | Great Britain ...... 162/30 |
| 1,112,617 | 6/1968 | Great Britain |

Primary Examiner—S. Leon Bashore
Assistant Examiner—Alfred D'Andrea, Jr.
Attorney, Agent, or Firm—Fetherstonhaugh & Co.

[57] ABSTRACT

A process of removing sodium chloride which has accumulated in the precipitator catch of the kraft pulping process chemical recovery systems without undue loss of sodium sulfate and other useful chemicals. The process basically comprises leaching precipitator catch, which contains sodium sulfate, sodium carbonate, sodium chloride and organic material, with sufficient aqueous sulfuric acid solution to produce a leached slurry of pH 3–6, thereby converting sodium carbonate to sodium sulfate and recovering sodium chloride.

13 Claims, 1 Drawing Figure

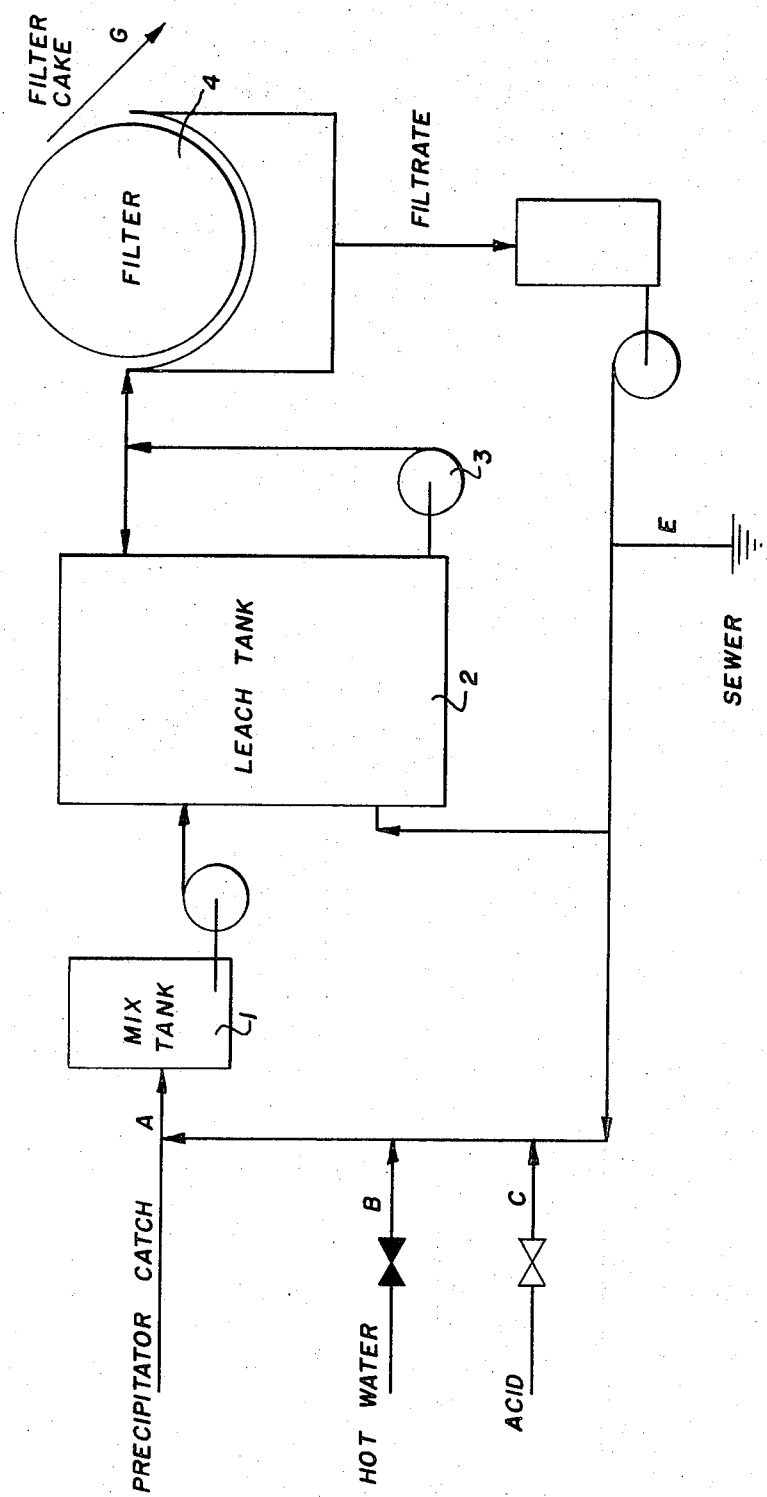

PROCESS OF REMOVING SODIUM CHLORIDE FROM KRAFT PULPING PROCESS CHEMICAL RECOVERY SYSTEMS

This invention relates to the removal of sodium chloride from the chemical recovery systems of kraft pulping processes.

In the conventional kraft process for the production of cellulosic fibrous pulp, lignocellulosic material is pulped with a "white liquor" containing sodium hydroxide and sodium sulfide to degrade hemicelluloses, lignin and other non-cellulosic material to soluble components. The remaining cellulosic fibre is separated from the resultant "black liquor" which is subsequently processed for chemical recovery.

In the recovery system, the black liquor is concentrated by evaporation and then reacted in a "recovery boiler" to yield a smelt containing principally sodium carbonate and sodium sulfide. The smelt is dissolved in water to give "green liquor". Lime is added to the green liquor to give a solution of sodium hydroxide and sodium sulfide (so-called white liquor), and a calcium carbonate precipitate. The precipitate is separated from the white liquor and calcined to regenerate lime.

Sodium chloride is introduced into the pulp mill by logs that have absorbed salt water during transportation. During pulping sodium chloride dissolves in the pulping liquor and remains in the chemical recovery cycle. This sodium chloride represents a dead load since it is inactive in the kraft pulping process, and it reduces the capacity of the recovery boiler due to the limits set on the solids content and the rate of feed of the black liquor into the recovery boiler.

Sodium chloride may also be introduced into the recovery boiler by reuse of bleach plant effluent. Chlorine and chlorine dioxide are pulp bleaching agents which are ultimately reduced to the chloride ion during bleaching. The bleach plant effluent is normally sewered. However, it can be used for washing the pulp prior to bleaching (so-called brown stock). In this manner, the bleach plant effluent would eventually be added to the recovery boiler, thus adding chloride to the chemical recovery dead load.

During the regeneration of pulping chemicals in the recovery boiler of the conventional chemical recovery systems some solid material is contained in the water vapour and carbon dioxide gaseous emission from the boiler. The solid material is usually recovered by an electrostatic precipitator and this is referred to as "precipitator catch". This precipitator catch contains sodium sulfate, which can be recycled to the recovery boiler and reduced to sodium sulfide.

Pulping mills that are supplied with logs towed through salt water have a problem with sodium chloride in the precipitator catch. In the existing leaching technology, enough water is added to just dissolve all the sodium chloride. This also results in some of the sodium sulfate being dissolved. Unfortunately for most precipitator catches, this results in greater than 40 percent undissolved solids (by weight) in the slurry. This slurry cannot be handled by conventional equipment. In addition, any sodium carbonate contained in the precipitator catch is dissolved during the leaching. This increases the concentration of useful sodium compounds in the leach liquor which, if discarded, represents a cost to the pulp mill.

The present process eliminates or greatly reduces these problems. This process includes leaching precipitator catch containing sodium sulfate, sodium carbonate and sodium chloride to give a slightly basic aqueous solution. The solution is then adjusted with sulfuric acid to give a slightly acidic medium and to convert sodium carbonate to sodium sulfate. With precipitator catches that are high in organic content, the precipitator catch can generally be leached directly with a slightly acidic solution. The leached solution is filtered to give a cake of anhydrous sodium sulfate and a filtrate enriched in sodium chloride, following which the cake and filtrate are separated. Some of the filtrate can be sewered, and the remainder recirculated to the initial leaching step. Some sodium sulfate is lost with the sewered sodium sulfate, but this is very small compared to the amount involved and to the amount of sodium chloride which is removed from the process.

In accordance with the present invention, the precipitator catch is leached to remove the sodium chloride and give a slightly basic slurry. Sulfuric acid, preferably spent sulfuric acid from a chlorine dioxide generator, is then added to give a slightly acidic medium and convert the sodium carbonate to sodium sulfate.

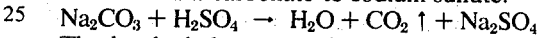
$Na_2CO_3 + H_2SO_4 \rightarrow H_2O + CO_2 \uparrow + Na_2SO_4$

The leached slurry containing usually about 10–20 percent undissolved solids (by weight) is filtered to give a cake of anhydrous sodium sulfate and a filtrate enriched in sodium chloride. A small portion of the filtrate (mother liquor) is sewered to remove sodium chloride from the system, and the remainder is used again for leaching along with spent acid and water makeup. Some useful sodium sulfate is lost in this sewering, approximately 1 lb. for every 3 to 4.5 lb. of sodium chloride sewered. If desired, the filtrate may, instead of being sewered, be used for some other purpose.

In this process sodium carbonate is converted to sodium sulfate by waste sulfuric acid, although it is economical to use fresh sulfuric acid. Most kraft mills use chlorine dioxide for bleaching and the conventional methods for generating chlorine dioxide give an effluent containing from 1.7 to 3.5 lb. sulfuric acid/lb chlorine dioxide. Normally this acid has little or no value to a kraft mill. The addition of sulfuric acid to the leach liquor generates a salt, sodium sulfate, which has a low solubility in the leached solution, thereby reducing the concentration of useful sodium salts in the leached solution. It is impractical, and generally uneconomical, to use other acids for pH control if the precipitator catch contains any significant amount of sodium carbonate. The recirculation of mother liquor after filtration provides for a material balance which can give a 10–20 percent undissolved solid in the leached slurry. This is optimum feed for most filtering operations.

Laboratory experiments have shown that by controlling the pH between 3.5 and 5.5 and the temperature between 50° and 65°C., the filtration rate is largely unaffected and the solubility of the carbonate species is virtually nil. The organics in the precipitator catch act as flucculating agents and some retention time is required. For a good filtration a retention time of about 30 to 60 minutes at the preferred pH and temperature is advisable. Longer times usually give only marginal better filtration, but if the catch is high in organics, shorter times can be used. Poor filtration rates result in large moisture retention (up to 45 percent) by the filter cake and a high chloride content in the cake (25 percent on an inorganic basis). Continuous and batch leaching experiments using recirculated leach filtrate (mother liquor) result in filter cakes of 85–95 percent sodium sulfate on an inorganic solids basis, washing giving 95 percent+.

Generally speaking, the leach solution can be filtered at about 40° to 80°C and pH about 3 to 6. The temperature is preferably from about 55° to 65°C and the pH about 4 to 5.

A simplified flow sheet is illustrated in the accompanying drawing.

Precipitator catch, hot water, and spent or fresh acid are supplied to the system at A, B and C, respectively. These mix in tank 1 and then are directed into leach tank 2. The slurry can be recirculated by pump 3 for agitating purposes. The slurry is directed to a suitable filter 4, and the filter cake is removed at G. Some of the filtrate is sewered or otherwise disposed of at E, while the remainder is directed back to mixing tank 1.

As stated above, it is preferable to use spent acid from a chlorine dioxide generator, although fresh sulfuric acid can be used. As an example, the leach tank can be maintained at a pH of 4.5, and a temperature from about 60° to 65°C. The filter cake produced is 90 to 95 percent sodium sulfate on inorganic solid basis. This results in a filtrate containing 280 gpl NaCl and 90 gpl $Na_2SO_4$.

The composition of the precipitator catch from one typical West Coast kraft mill showed the following variations:

| | |
|---|---|
| $Na_2SO_4$ | 48.4 to 71.0% |
| NaCl | 23.0 to 33.9% |
| $Na_2CO_3$ | 0.1 to 11.5% |
| Organics | 0.9 to 9.5% |

The major determining factor for acid consumption is the sodium carbonate content, 0.92 lb $H_2SO_4$ consumed/lb $Na_2CO_3$. The organics consume from 0.1 to 0.15 lb $H_2SO_4$/lb.

The following are three examples illustrating the above-described process:

EXAMPLE 1

Liquor (1000 g) obtained from a previous leach of the following composition, 282.3 gpl NaCl, 99.3 gpl $Na_2SO_4$ and ph 4.9, was placed in an open vessel and heated with agitation to 55 ± 3°C. Precipitator catch (200 g) of the following composition, 48.4% $Na_2SO_4$, 31.4% NaCl, 11.5% $Na_2CO_3$ and 5.3 percent organics, deionized water (157 g) and spent sulfuric acid (57 ml) of the following composition, 468 gpl $H_2So_4$ and 340 gpl $Na_2SO_4$, were slowly added to leach liquor over 70 minutes.

The precipitator catch and spent acid were added at a rate which insured immediate dispersion of the solid, a low level of foaming and a fairly constant pH (4.5 ± 0.5). After addition, the mixture was held at 55°C with minimum agitation for 30 minutes.

The resultant slurry, approximately 13 percent undissolved solids, was filtered on a Buchner funnel at 8 inches Hg vacuum and then at 5–6 inches Hg for 15 minutes to remove as much liquor as possible from the cake. The filtrate (1110 g) contained 286.5 gpl NaCl and 100 gpl $Na_2SO_4$ at a pH of 4.9.

The filter cake (247 g) was dried overnight at 120°–130°C. The dry filter cake (180 g) contained 83.9% $Na_2SO_4$ and 15% NaCl.

EXAMPLE 2

Liquor (1000 g) obtained from a previous leach of the following composition, 281.8 gpl NaCl and 88.1 gpl $Na_2SO_4$ was heated to 65°C with good agitation. Precipitator catch (200 g — identical to that used in Example 1), deionized water (157 ml) and spent acid (62.8 ml — identical to that used in Example 1) was added in Example 1 except that the pH was maintained at 3.5 ± 0.5.

The filtration was carried out as in Example 1. The filtrate (1182 g) contained 287.8 gpl NaCl and 98.2 gpl $Na_2SO_4$ and had a pH of 3.5. The filter cake (166 g) was dried at 120°–130°C. The dried filter cake (147 g) contained 89.3% $Na_2SO_4$ and 6.2% NaCl.

EXAMPLE 3

When this precipitator catch (low in organics) was initially leached in a slightly acidic solution, an unacceptable filtration rate and filter cake moisture (35 percent) resulted. Thus, it first had to be leached in a slightly basic solution.

The leach liquor (675 ml, 285 gpl NaCl and 75 gpl $Na_2So_4$) was placed in a beaker and heated to 65°C. Precipitator catch (200 g) of the following composition, 63.2% $Na_2SO_4$, 30.5 NaCl, 3.0% $Na_2CO_3$, and 2% organics and water (144 g) were mixed together to form a slurry of ph 9.1. The slurry was then added slowly to the leach liquor along with diluted chloride dioxide generator effluent (50 ml at 112 gpl $H_2SO_4$). During addition, the pH was maintained at 4.5 ± 0.5. The addition of the slurry took 15 minutes, after which the mixture was stirred for one hour at 65 ± 3°C.

The resultant mixture, approximately 10 percent undissolved solids, was filtered on a Buchner funnel at 8″ Hg vacuum for 30 seconds. The filtrate (985 g) contained 309 gpl NaCl and 76 gpl $Na_2SO_4$.

The filter cake (197 g) was dried overnight at 12°–130°C. The dry filter cake (150 g) contained 84.7% $Na_2SO_4$ and 13% NaCl.

The filter cake obtained from this leaching process can be added to the existing recovery boilers along with the other feed (black liquor). An alternative is to feed the filter cake into a separate recovery boiler and reduce it to $Na_2S$. The $Na_2S$ can be reused in the pulping process, marketed to other mills or industries, or converted to $H_2S$ by carbonation with lime kiln gas ($CO_2$). The $H_2S$ can in turn be oxidized to $H_2SO_4$ for use in chlorine dioxide generation. In this manner, the filter cake from the leaching process can be used to limit the sulfur input to the mill and thus control the sulfur balance of the mill.

We claim:

1. The process of removing sodium chloride from the chemical recovery systems of kraft pulping processes, which comprises the steps of leaching precipitator catch containing sodium sulfate, sodium carbonate, sodium chloride and organic material, to convert the sodium carbonate to sodium sulfate and to remove said sodium chloride, with aqueous solution containing only sufficient sulfuric acid to produce a leached slurry having a pH of about 3 to 6 and containing undissolved solids in a state readily separable from the liquid, filtering the leached slurry to provide a solid cake phase of anhydrous sodium sulfate and a liquid phase enriched in sodium chloride, and separate said liquid phase from the solid phase.

2. The process as claimed in claim 1 in which the acid is spent sulfuric acid from a chlorine dioxide generator.

3. The process as claimed in claim 1 in which the anhydrous sodium sulfate is reduced to sodium sulfide and/or hydrogen sulfide.

4. The process as claimed in claim 1 in which the leach solution is filtered at about 40° to 80°C.

5. The process as claimed in claim 1 in which the leach solution is filtered at about 55°–65°C and pH about 4 to 5.

6. In the process for the pulping of lignocellulosic material comprising the steps of cooking the material with pulping liquor, evaporation of the pulping liquor, combustion of the pulping liquor, and precipitation as precipitator catch of the inorganic solids that are mixed with the combustion gases, said precipitator catch containing sodium sulfate, sodium carbonate, sodium chloride and organic material, the process which comprises the steps of leaching said precipitator catch to convert said sodium carbonate to sodium sulfate and to remove sodium chloride with an acidic aqueous solution containing only sufficient sulfuric acid to produce a leached slurry having a pH of about 3 to 6 and containing undissolved solids in a state readily separable from the liquid, filtering the leached slurry to provide a solid cake phase of anhydrous sodium sulfate and a liquid phase enriched in sodium chloride, separating said liquid phase from the solid phase and recycling a portion of said liquid phase to said leaching step.

7. A process as claimed in claim 6 wherein the acid is spent sulfuric acid from a chlorine dioxide generator.

8. A process as claimed in claim 6 wherein the anhydrous sodium sulfate is reduced to sodium sulfide and/or hydrogen sulfide.

9. A process as claimed in claim 6 wherein the leach solution is filtered at 40°–80°C.

10. A process as claimed in claim 6 wherein the leach solution is filtered at about 55°–65°C. and pH about 4 to 5.

11. The process of removing sodium chloride from the chemical recovery systems of kraft pulping processes, which comprises heating and agitating liquor containing sodium chloride and sodium sulfate and pH about 4.9 to about 55°C., slowly adding water, sulfuric acid and precipitator catch containing sodium sulfate, sodium chloride, sodium carbonate and organic material, to said liquor, while maintaining temperature at about 55°C. and the pH at about 4.5 with some agitation for about 30 minutes, the resulting aqueous solution containing only sufficient acid to produce a leached slurry containing undissolved solids in a state readily separable from the liquid and to convert the sodium carbonate to sodium sulfate, filtering the leached slurry to remove as much sodium chloride-enriched liquor as possible from the formed filter cake, drying said cake and recycling a portion of said liquid phase to said leaching step.

12. The process of removing sodium chloride from the chemical recovery system of kraft pulping processes, which comprises the steps of leaching the precipitator catch containing sodium sulfate, sodium carbonate, sodium chloride and organic material to convert the sodium carbonate to sodium sulfate and to remove said sodium chloride first in a slightly basic solution to provide a leached slurry containing udissolved solids, adjusting said slurry, by the addition of sulfuric acid to a slightly acidic solution containing only sufficient acid to produce a leached slurry having a pH of about 3 to 6 and containing undissolved solids in a state readily separable from the liquid, filtering the leached slurry to give a cake of anhydrous sodium sulfate separated from a filtrate enriched in sodium chloride and recycling a portion of said liquid phase to said leaching step.

13. A process as claimed in claim 6 including leaching said precipitated inorganic solids first in a slightly basic solution and then adjusting to said slightly acidic solution having a pH of about 3 to 6.

* * * * *

UNITED STATES PATENT AND TRADEMARK OFFICE
CERTIFICATE OF CORRECTION

PATENT NO. : 3,833,462
DATED : September 3, 1974
INVENTOR(S) : Moy et al

It is certified that error appears in the above—identified patent and that said Letters Patent are hereby corrected as shown below:

Claim 1, next to the last line, change "separate" to ---separating---.

Signed and Sealed this

Twenty-seventh Day of March 1979

[SEAL]

Attest:

RUTH C. MASON
Attesting Officer

DONALD W. BANNER
Commissioner of Patents and Trademarks